(12) United States Patent
Hall et al.

(10) Patent No.: US 11,068,843 B2
(45) Date of Patent: Jul. 20, 2021

(54) AUGMENTED REALITY INVENTORY MANAGEMENT SYSTEM

(71) Applicants: David R. Hall, Provo, UT (US); Jared Eggett, Lehi, UT (US); Ben Swenson, Lehi, UT (US); Steven J. M. Butala, Provo, UT (US); Conrad Rosenbrock, Provo, UT (US)

(72) Inventors: David R. Hall, Provo, UT (US); Jared Eggett, Lehi, UT (US); Ben Swenson, Lehi, UT (US); Steven J. M. Butala, Provo, UT (US); Conrad Rosenbrock, Provo, UT (US)

(73) Assignee: Hall Labs LLC, Provo, UT (US)

( * ) Notice: Subject to any disclaimer, the term of this patent is extended or adjusted under 35 U.S.C. 154(b) by 357 days.

(21) Appl. No.: 15/976,438

(22) Filed: May 10, 2018

(65) Prior Publication Data
US 2019/0347608 A1 Nov. 14, 2019

(51) Int. Cl.
*G06Q 10/08* (2012.01)
*G06K 7/14* (2006.01)
*G02B 27/01* (2006.01)

(52) U.S. Cl.
CPC ....... *G06Q 10/087* (2013.01); *G02B 27/0172* (2013.01); *G06K 7/1413* (2013.01); *G02B 2027/0141* (2013.01); *G02B 2027/0178* (2013.01)

(58) Field of Classification Search
CPC ............... G06Q 10/087; G06K 7/1413; G02B 27/0172; G02B 2027/0141; G02B 2027/0178
USPC ......................................................... 705/28
See application file for complete search history.

(56) References Cited

U.S. PATENT DOCUMENTS

| 2015/0019391 A1* | 1/2015 | Kumar | G06Q 10/087 705/28 |
| 2018/0025310 A1* | 1/2018 | Gabbai | G06Q 10/087 705/28 |

* cited by examiner

*Primary Examiner* — Garcia Ade

(57) ABSTRACT

The inventory management system ("the system") includes a series of bar codes and a bar code reader. The bar codes are placed around the inventory storage area on or near containers which store inventory items. The bar codes identify the contents of the container. The system includes a bar code reader and an augmented reality viewing device. The system includes a processor which stores instructions for identifying the bar codes associated with each of the inventory items in an order. When the bar code reader scans a bar code associated with an item in the order, the augmented reality viewing device emits a cue that indicates the item should be picked. The containers may be connected to sensors which detect when an item has been removed and which transmit the sensor data to a processor. The processor may include instructions for processing the sensor data to maintain a current inventory.

19 Claims, 9 Drawing Sheets

AUGMENTED REALITY INVENTORY MANAGEMENT SYSTEM

BACKGROUND

Field of the Invention

This invention relates generally to methods of managing, tracking, and retrieving inventory from a storage area.

Background of the Invention

Online and catalog shopping enables consumers to purchase goods without visiting a traditional brick-and-mortar store. On-line purchasing typically includes the steps of transmitting an order to a warehouse or other storage area which stores many pieces of merchandise. The storage area typically utilizes a system for organizing the merchandise so that an employee can locate and retrieve the items in each order. The same or similar system may be utilized either in a warehouse that acts as a wholesale supply source for retail merchants or in the retail merchant's inventory storage area.

Various systems are available which are designed to improve the efficiency of retrieving items in an order from their locations in a storage area and keeping track of the remaining inventory. The pick-to-light system is commonly used to quickly direct employees to bins or other containers which store items to be included in an order. In an example, the user scans one or more bar codes which have been placed on a tote. The bar codes represent the items in a single order. A lighted indicator then illuminates above a container which stores the first item in the order. The employee removes the desired number of items from the container then presses a button to deactivate the lighted indicator thus confirming the pick. A lighted illuminator is then illuminated over the container which stores the next item in the order and the process is repeated until the order is filled.

Deficiencies in the pick-to-light system include the need to replace light bulbs. Also, the pick-to-light system requires a worker to notice which of the lights is illuminated. This may be difficult in a large storage area such as a warehouse. By requiring this human input, the mental acuity of the worker becomes relevant and a smaller storage area is favored.

SUMMARY OF THE INVENTION

We disclose an inventory management system ("the system") which includes multiple inventory bar codes which may be placed on or around inventory storage containers. The inventory bar codes may be visible to the human eye or be constructed of ink which reflects light in the ultraviolet range, the infrared range, or both. The inventory bar codes may be displayed on LED or LCD screens which may be changed periodically using a processor. The system includes one or more bar code readers which scan the inventory bar codes to identify the contents of each container.

The system may include an augmented reality viewing device which is in electronic connection with a processor. The processor may include a database which stores the identity of each of the inventory items and a bar code pattern that is associated with each inventory item. In other words, the database may include the "key" to the bar code patterns. In addition, the processor may include non-transitory computer-readable medium which includes instructions for receiving a request to retrieve one or more inventory items, for example, to fill a customer's order. The non-transitory computer-readable medium may also include instructions for receiving a bar code reading that is transmitted to the processor by a data transmitter associated with the bar code reader when the bar code reader scans inventory bar codes. The non-transitory computer-readable medium may further include instructions for comparing bar code readings with the inventory bar codes that are associated with the inventory items in the request. The non-transitory computer-readable medium may include instructions to then transmit a signal to the augmented reality viewing device which indicates whether the scanned bar code is associated with one of the inventory items in the request.

The augmented reality viewing device may display a user interface which provides a cue telling the worker whether the scanned bar code is associated with an inventory item in the request and thus, whether to pick the item. The user interface may include a visual cue, an audible cue, or both a visual and an audible cue. For example, a screen on the augmented reality view device may display the scanned inventory bar code or an image thereof. If the scanned inventory bar code is associated with an inventory item in the request, the image on the screen may change to a defined color. In other examples, the image on the screen may flash or turn to a different image.

In some embodiments the augmented reality device may be a pair of smart goggles a worker wears while moving through the inventory storage area. The augmented reality view perceived through the user interface may show up before the workers eyes as seen through the goggles. Other examples of augmented reality devices include eyeglasses, a visor, an ocular contact lens, a mobile device, a computer screen, and a digital camera. In some embodiments, the augmented reality view device includes a bar code scanner so that the device may both scan bar codes and provide cues through the user interface.

In some embodiments, the system includes one or mores sensors in connection with the containers. The sensor may conduct measurements which determine the quantity or amount of inventory stored in the container. For example, the sensor may be a pressure sensor which detects changes in weight or mass within the container. A data transmitter may send a weight or mass measurement to the processor which calculates the quantity of inventory items based on the current weight or mass. In other examples, the containers may include a laser beam diode and laser beam sensor. The laser beam sensor may detect a break in a laser beam when a worker reaches into the container to pick an inventory item. Each time the worker retrieves an inventory item, the laser beam is broken. A data transmitter sends a signal to the processor each time the laser beam sensor detects a break in the laser beam. The processor may calculate the remaining number of inventory items based on the number of times the laser beam was broken.

In yet another embodiment, a picked inventory item may be communicated to the system after the bar code reader scans the bar code associated with the requested inventory item. The worker may cover the inventory bar code with a hand blocking the bar code reader's view of the inventory bar code. The worker may then remove the hand which again exposes the inventory bar code to the bar coder reader to be scanned again. A data transmitter may send a signal to the processor indicating that this series of events has occurred. This will alert the processor that an inventory item has been picked and the item deducted from the inventory count.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where.

DETAILED DESCRIPTION OF THE INVENTION

Definitions

Figure 1A:
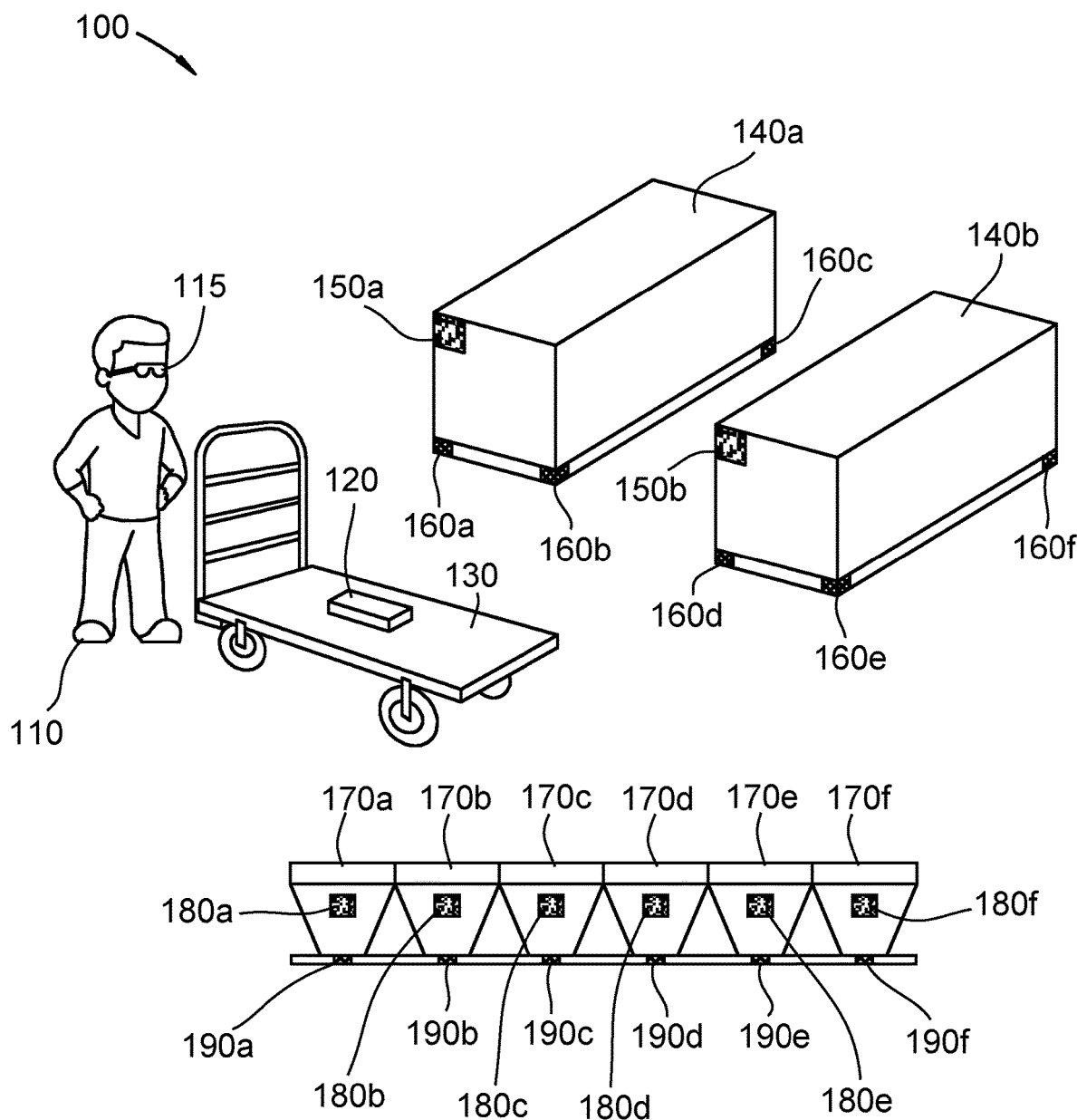
FIG. 1A is a perspective view illustrating of a worker in a warehouse which uses an embodiment of the disclosed inventory management system.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein "mobile device" means a portable computing device which provides wired or wireless communication. Examples include smartphones, tablets, and laptop computers.

As used herein "electronic communication" means a communication between electronic devices which may be either through wired or wireless methods. In an example, "electronic communication" includes a communication through WiFi.

As used herein, "bar code" means an optical, machine-readable, representation of data. As used herein, a "bar code" may include a one-dimensional (1D) or two-dimensional (2D) bar code. In an example, a bar code is a Quick Response code, hereinafter, "QR code," Data Matric, a DotCode, or a CrontoSign. In another example, the "bar code" may resemble a 1D Universal Product Code (UPC).

As used herein, "augmented reality" means a view in which a computer-generated image is superimposed on a user's view of the real world, thus providing a composite view.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose an inventory management system in which bar codes may be placed on pallets, bins, or other containers which store inventory items. These bar codes may identify the items stored in each container. Therefore, these bar codes are referred to herein as "inventory bar codes." The system includes at least one bar code reader. The bar code reader may be disposed within a worker's mobile device, for example, the worker's smart phone or tablet. In some embodiments, the bar code reader may be disposed within a pair of smart goggles that the user wears. In the latter example, the worker may wear the goggles while moving around the inventory storage area. The bar code reader in the goggles may scan inventory bar codes as the worker comes upon them without the worker actively pointing the bar code reader at an inventory bar code and actuating the bar code reader.

The disclosed inventory management system may include a processor. Software may be stored on the processor in the form of non-transitory computer-readable medium. The processor may also store a database which includes (1) information about each inventory item, including its identity, and (2) the inventory bar code associated with each inventory item. Consequently, the database may store a record, or a "key," which indicates which of the inventory bar codes is associated with which inventory item.

The inventory bar codes and the information associated with them may be entered into the database using a variety of techniques known in the art. In some embodiments, the inventory bar codes and the information describing their associated inventory item may be entered in the processor through manual data entry. This may include keying information into a processor using a keyboard, associating a stored bar code with an inventory item by clicking on images of each using a mouse, or scanning an inventory bar code with a bar code scanner and keying in the information about the inventory item. Alternatively, cameras that include bar code readers may scan the inventory bar codes throughout the inventory storage area and store their relative positions in an electronic map. Using a processor, a worker may then enter the identity of the inventory item stored in each of the containers on the electronic map. Once the database with the above-referenced "key" is populated, when a bar code reader scans an inventory bar code, the non-transitory computer-readable medium may initiate steps provided in instructions therein to identify which inventory item is stored in the container on which the inventory bar code is placed and whether the inventory item is part of the order being filled.

The non-transitory computer-readable medium on the processor may include instructions for receiving an order for one or more inventory items. This order may be entered in the processor directly and electronically when a customer sends an electronic order. Alternatively, a worker may enter the order by scanning or keying it into the processor when the order is received. In some embodiments, a bar code which describes the inventory items in the order may be attached to a tote to be filled with the ordered inventory items. A worker may be assigned the task of collecting (hereinafter, "picking") the inventory items to fill the customer's order using the disclosed system.

The disclosed inventory management system may include a user interface (hereinafter, "UI"). The UI may include an augmented reality view which may be visible on a screen disposed on any or all of goggles, a mobile device, or a desktop computer screen. The UI may indicate when the bar code reader has scanned an inventory bar code. The UI may also indicate when the bar code reader has scanned one of the inventory bar codes associated with one of the inventory items on a customer's order. Accordingly, the worker is alerted whether to pick an item from the container on which the inventory bar code is positioned.

In some examples, the UI may produce a detectable signal to alert the worker to pick the inventory item. In an example, the UI may display an augmented reality view of the inventory bar code on a screen of a mobile device or a visual display the worker may view through the goggles. In some embodiments, the UI may display the augmented reality view of the inventory bar code on a screen associated with the container. In an example of the augmented reality view of the inventory bar code, the inventory bar code may change colors when the bar code reader identifies the inventory bar code as one associated with an inventory item to be picked. In another example, the inventory bar code may flash to indicate that it is associated with an inventory item to be picked. In yet another example, the augmented reality view may display a number indicating how many of the inventory items are to be picked to fill the order. In another example, the UI may produce an audible sound to alert the worker to pick the item.

In some embodiments, the inventory bar codes are not visible to the human eye. In an embodiment, the ink may reflect light comprising a wavelength which is outside the human visible range. For example, the inventory bar codes may be printed using ink that either emits light in or near the ultraviolet range or has an excitation wavelength within or near the ultraviolet wavelengths. In some examples, the ink used to print the inventory bar codes reflects light comprising a wavelength of between about 350 nm and about 405 nm. In some examples, the ink may emit light in or near an infrared range or have an excitation wavelength within or near the infrared wavelengths. In some examples, the ink may reflect or emit light in both the ultraviolet wavelengths and the infrared wavelengths.

In some embodiments, the inventory bar codes may be displayed on a light-emitting diode (LED) or liquid crystal display (LCD) screen. The screen may be electronically connected to the processor. A worker may change the inventory bar code displayed on the screen by interfacing with the processor. For example, the worker may change the inventory bar code by entering the change through the software on the processor. In more specific examples, the worker may key the change into a desktop computer or scan a new inventory bar code with a bar code scanner. The worker may then communicate to the system through the processor that this is the new display. For example, the worker may communicate this change to the system by pressing a button on the LED or LCD screen or by keying in or clicking an icon on a computer screen.

The inventory management system may also continually monitor the quantity of inventory in each of the containers throughout the inventory storage area. In an example, each container may comprise a sensor which collects data relating to the quantity of inventory in the container. This data may be used to calculate the quantity of inventory items within the container. In an example, the sensor is a pressure sensor which measures the mass or weight of the items in the container. The sensor may include or be in connection with a data transmitter which may transmit sensor readings to the processor. The data may be transmitted directly to the processor or to a remote database, for example, a cloud database. The remote database may store software in the form of non-transitory computer-readable medium which may use the sensor reading to calculate the quantity of inventory items in the container. For example, a worker may enter an identity and quantity of an inventory item stored in each container into the processor. This information may be transmitted to the remote database. Software stored on the remote database may calculate the mass or weight per inventory item using the total mass/weight of the container and the quantity of items in the container. When a worker picks an item from the container, the measured weight/mass is reduced. The data transmitter may transmit the new sensor reading to the remote database and the software may calculate a new quantity of inventory items in the container.

Similar to the pick-to-light systems, some embodiments of the inventory management system enable a worker to communicate to the system when the worker picks an inventory item. However, the disclosed system requires no light bulbs. In an example, the bar code reader may scan an inventory bar code on a container which stores an inventory item to be picked. The worker may place a hand over the inventory bar code temporarily blocking the view of the bar code reader. The worker may then remove the hand again exposing the inventory bar code to the bar code reader. Software associated with the disclosed warehouse management system may interpret this signal as a picked item. The worker may repeat this sequence for each item picked. Accordingly, the software may update the quantity of inventory items in the container thus keeping a continued inventory count for items in each container.

Referring now to the drawings, FIG. 1A illustrates inventory storage area 100 which uses an embodiment of the disclosed inventory management system. Worker 110 is wearing goggles 115 to view inventory bar codes as described below. Goggles 115 function as an augmented reality viewing device and include a bar code reader. Worker 110 has placed inventory item 120 on cart 130. Inventory storage area 100 includes inventory items which are stored on pallets 140a and 140b. Pallet 140a is labeled with inventory bar code 150a and pallet 150b is labeled with inventory bar code 150b. Pallet 140a is in connection with pressure sensors 160a, 160b, and 160c, which are each below a corner of pallet 140a. A fourth pressure sensor, placed below the left rear corner of pallet 140a, is not visible. Pallet 140b is in connection with pressure sensors 160d, 160e, and 160f. An additional pressure sensor, placed below the left rear corner of pallet 140b, is not visible. Inventory storage area 100 further includes bins 170a-f which are each labeled with one of inventory bar codes 180a-f respectively. One of pressures sensors 190a-f is positioned below each of bins 170*a-f* respectively. Pressure sensors 160*a-f* and 190*a-f* conduct measurements of weight or mass. Changes in weight or mass indicate changes in the number or amount of inventory in the containers.

Figure 1B:
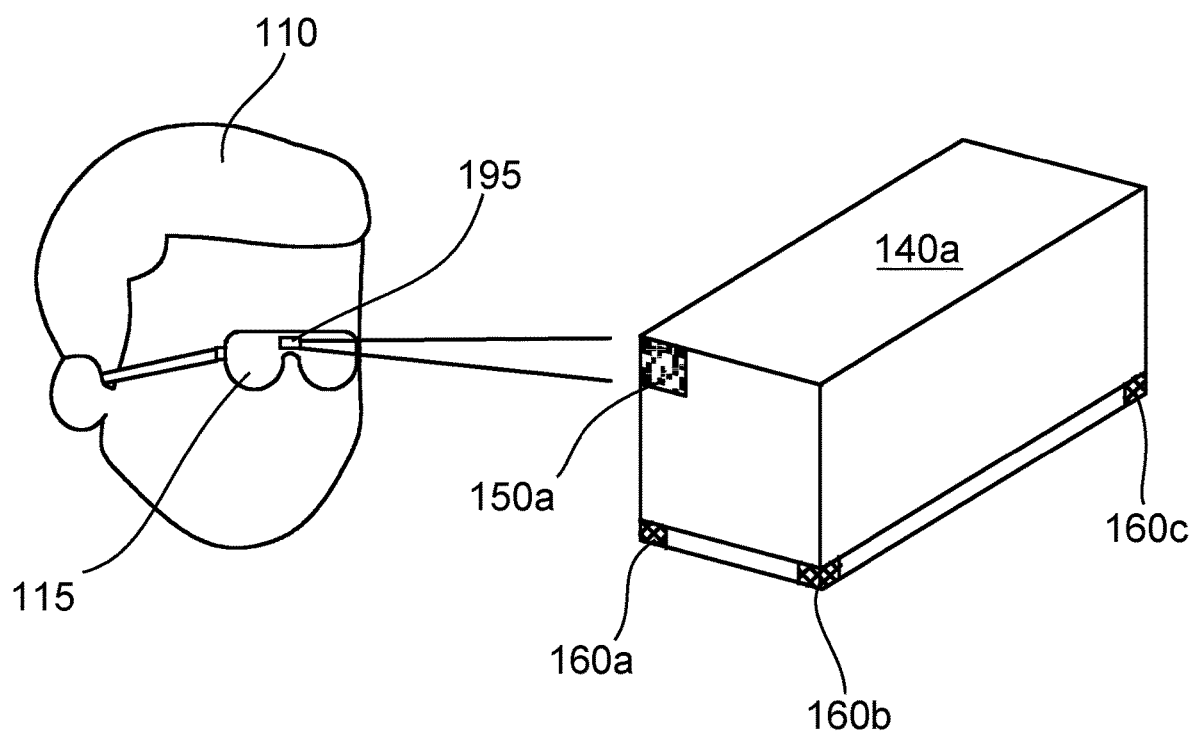
FIG. 1B is a perspective view illustrating a worker using goggles according to an embodiment of the disclosed inventory management system.

FIG. 1B is a closer view of worker 110 using goggles 115. Goggles 115 include bar code reader 195. Worker 110 is shown scanning inventory bar code 150*a* on pallet 140*a* to determine whether pallet 140*a* stores a requested inventory item.

Figure 1C:
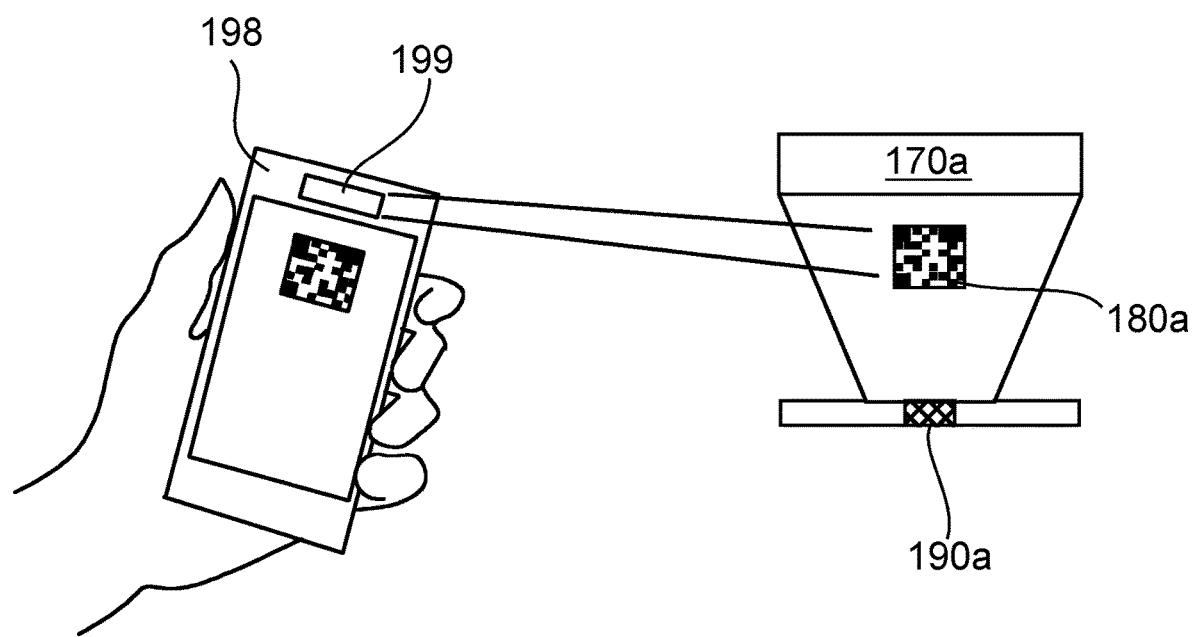
FIG. 1C is a perspective view illustrating a worker scanning an inventory bar code according to an embodiment of the disclosed inventory management system.

FIG. 1C shows another embodiment of the disclosed inventory management system in which a worker is using mobile device 198 to scan inventory bar code 180*a* on bin 170*a*. Mobile device 198 includes bar code reader 199 which is shown scanning inventory bar code 180*a*. In this embodiment, mobile device 198 functions in place of goggles 115 in FIGS. 1A and 1B. As first shown in FIG. 1A, bin 170*a* includes pressure sensor 190*a* to track the contents quantity of inventory in bin 170*a* as described in more detail herein.

Figure 2:
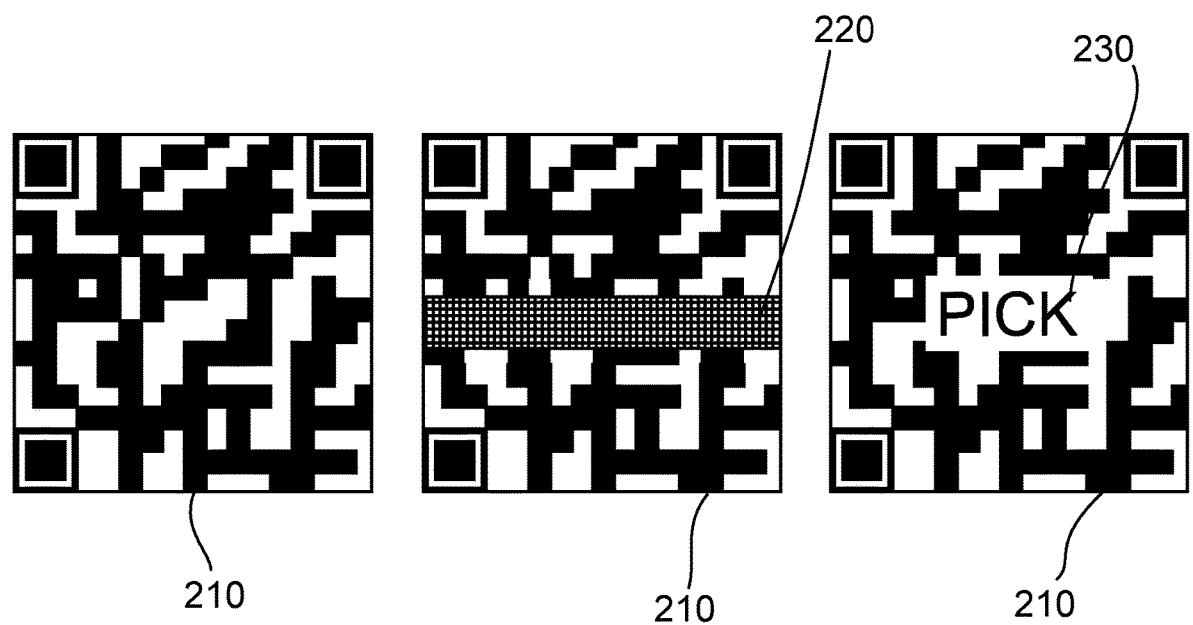
FIG. 2 is a schematic drawing of an example of an image shown on a user interface according to an embodiment of the disclosed inventory management system.

FIG. 2 illustrates how an augmented reality viewing device may display an augmented reality view through a UI when a worker scans an inventory bar code to determine whether it is associated with a requested inventory item. Inventory bar code 210 is first shown on the far left of FIG. 2 before a worker has scanned it with a bar code reader. In the center, as the worker scans inventory bar code 210, bar 220 is shown descending from top to bottom of inventory bar code 210 to indicate that scanning is in progress. On the far right, a visual indicator 230 appears on inventory bar code 210 in the form of the word "PICK." This indicator alerts the worker that inventory bar code 210 is associated with a requested inventory item and that the user should pick the item.

Figure 3A:
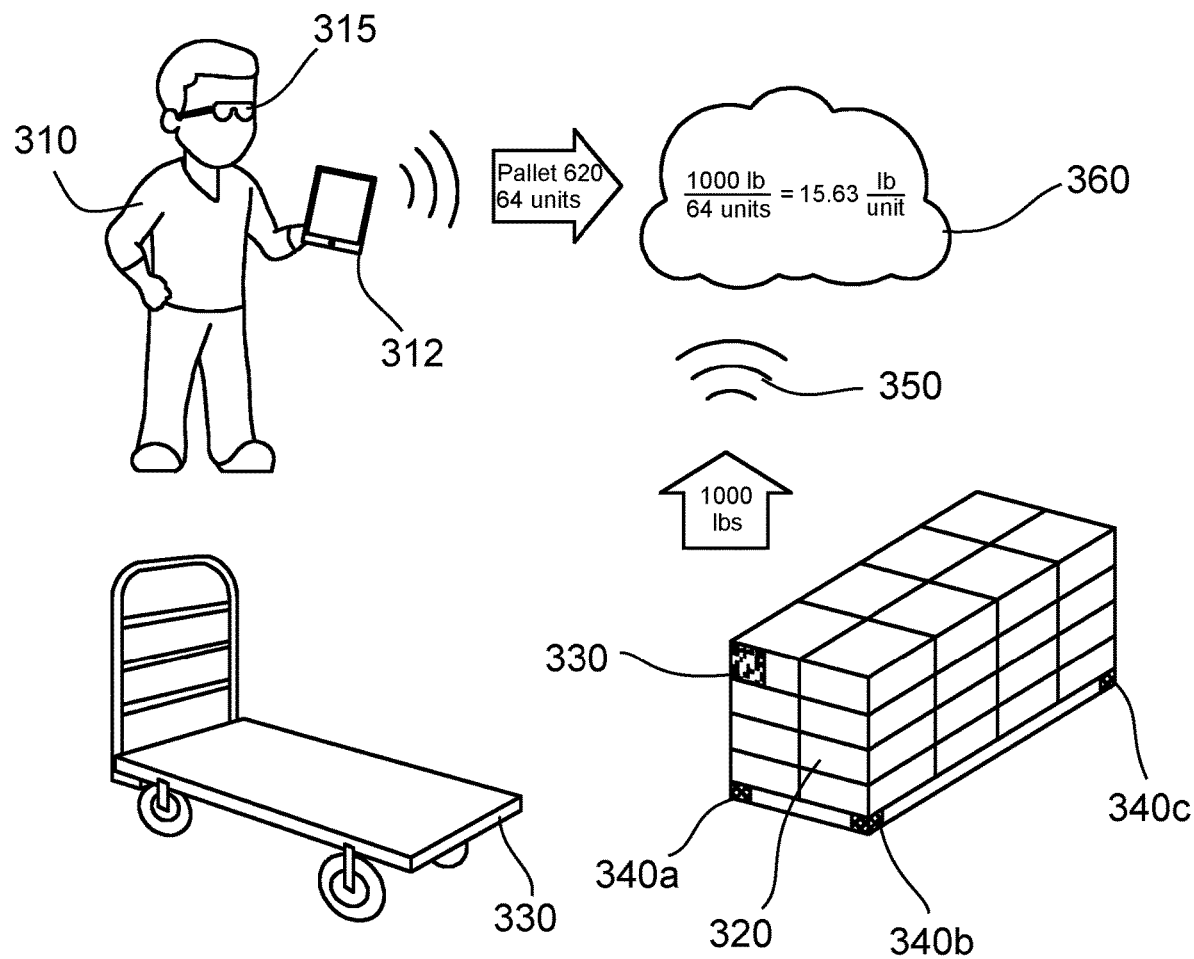
FIG. 3A is a perspective view illustrating a worker communicating with an embodiment of the disclosed inventory management system.

FIG. 3A illustrates a scenario in which a user's processor, which may be a desktop or laptop computer, a tablet, a smart phone, or any other type of processor capable of receiving data, communicates with an embodiment of the disclosed inventory management system. Worker 310 is entering the number of items stored on pallet 320 into processor 312 which, in this example is a tablet. In the example, this number is 64 units. According to this embodiment of the inventory management system, pallet 320 is labeled with bar code 330 and is in connection with pressure sensors 340*a-c*. In this embodiment, pressure sensors 340*a-c* are each below a corner of pallet 320. Another pressure sensor, placed below the left rear corner of pallet 320, is not visible.

The pressure sensors measure the mass or weight of the units on pallet 320. At this point, the pressures sensors measure 1000 lbs. Wireless signal 350 transmits the weight of 1000 lbs. to cloud database 360 which stores instructions to calculate the weight per unit on pallet 320. In this case, each unit weights 15.63 lbs.

Figure 3B:
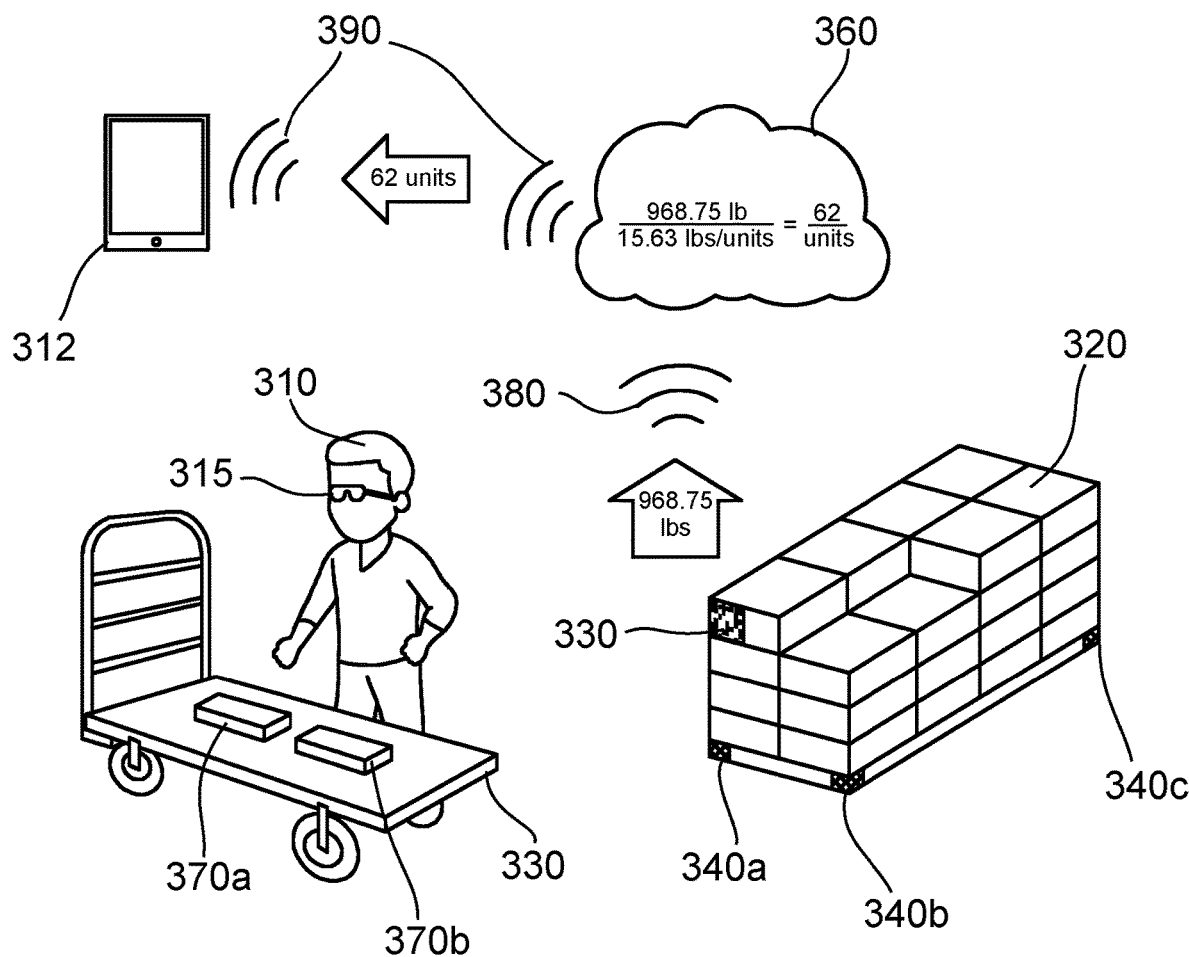
FIG. 3B is a perspective view illustrating an embodiment of the disclosed inventory management system communicating with a worker.

FIG. 3B illustrates the embodiment shown in FIG. 3A in which worker 310 has removed two units, units 370*a* and 370*b*, from pallet 320 to fill a customer's order. Pressure sensors 340*a-c* detect the weight of the units on pallet 320, which is 968.75 lbs. Wireless signal 380 transmits the data indicating that the total units on pallet 320 weigh 968.75 lbs. to cloud database 360. Non-transitory computer-readable media stored on cloud database 360 calculates the total number of remaining units stored on pallet 320 using the information entered into cloud database 360 as shown in FIG. 3A. In this scenario, the total number of units remaining on pallet 320 is 62 units. Wireless signal 390 transmits the total number of units on pallet 320 to processor 312. Accordingly, worker 310 may continuously keep a running total of the inventory on pallet 320 and elsewhere in the inventory storage area.

Figure 4:
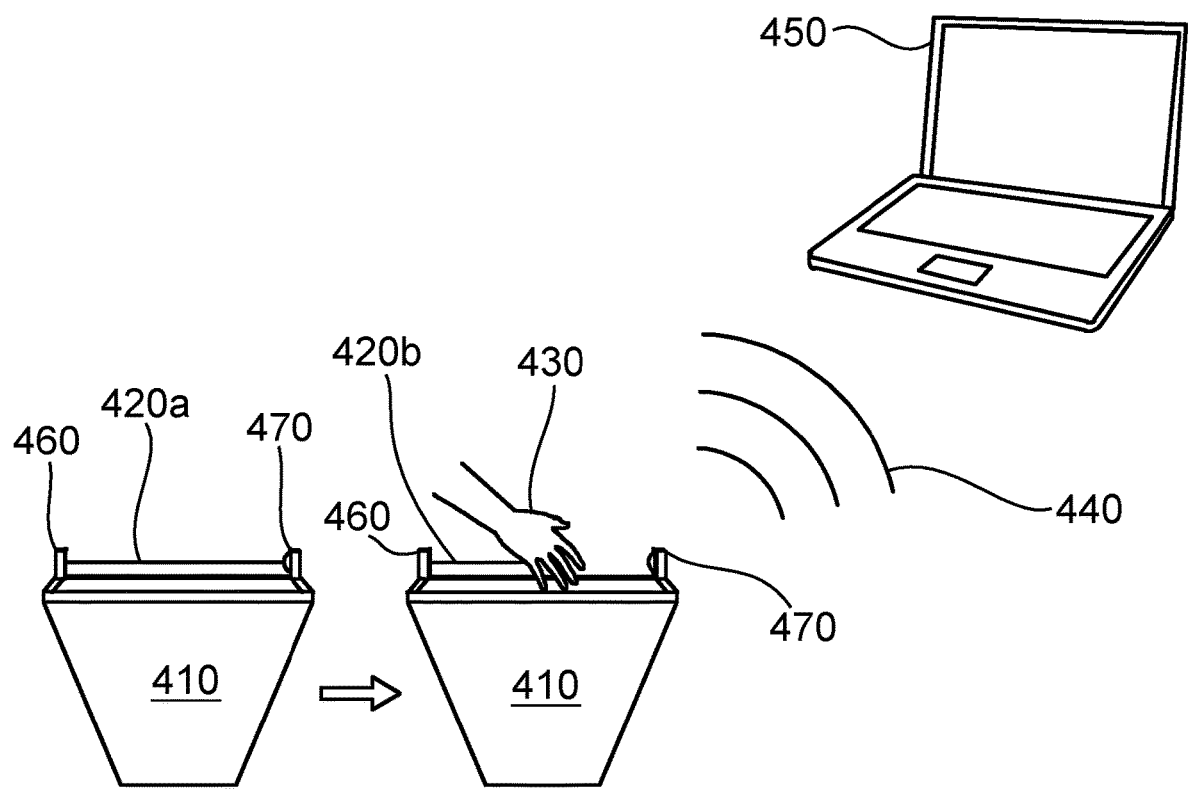
FIG. 4 is a schematic view of an embodiment of the disclosed inventory management system which includes a laser beam sensor to indicate a pick has occurred.

FIG. 4 shows an embodiment of the disclosed inventory management system in which bin 410 includes unbroken laser beam 420*a*. Laser beam diode 460 emits unbroken laser beam 420*a* and laser beam sensor 470 detects the unbroken laser beam 420*a*. When a worker inserts a hand 430 into bin 410, hand 430 breaks laser beam 420*a* resulting in broken laser beam 420*b*. Laser beam sensor 470 detects the conversion of laser beam 420*a* to broken laser beam 420*b*. A data transmitter within bin 410 (not shown for clarity) sends wireless signal 440 to processor 450 to indicate that unbroken laser beam 420*a* has been broken (creating broken laser beam 420*b*) and thus a pick has occurred. This process occurs each time the worker inserts hand 430 into bin 410 to pick an inventory item. Processor 450 thereby keeps a continuous count of the inventory items in bin 410.

Figure 5:
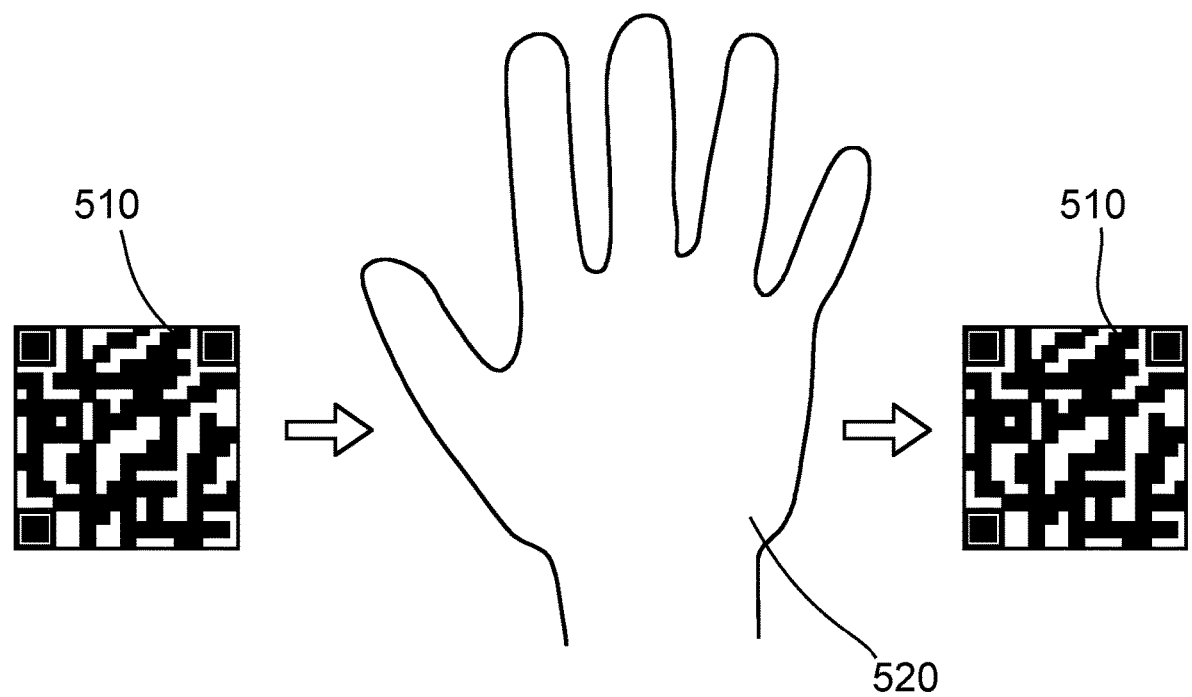
FIG. 5 is a schematic view of a virtual pick light according to an embodiment of the disclosed inventory management system.

FIG. 5 shows an embodiment of a method a worker may communicate to the disclosed inventory management system that an inventory item has been picked and the quantity picked. In this example, a worker communicates to the inventory management system when items are picked from a container to fill an order. The view shown in FIG. 5 is as seen by a worker through a UI on an augmented reality viewing device as described herein. Inventory bar code 510 is first shown on the far left. A bar code reader reads inventory bar code 510 to determine whether the associated container stores a desired inventory item. Hand 520 is that of a worker who has just picked an item from the container associated with inventory bar code 510 and is shown covering inventory bar code 510. By covering inventory bar code 510, the bar code reader cannot read bar code 510 and the signal between inventory bar code 510 and the system is interrupted. This interruption acts as a signal the system. In the right panel, the worker has removed hand 520 and exposed inventory bar code 510 to the bar code reader. The bar code reader may then detect bar code 510 completing the signal that informs the system that an item from the container associated with inventory bar code 510 has been picked. In this embodiment, the worker may repeatedly cover bar code 510 and remove hand 520 to indicate each time the worker picks an item. Accordingly, the quantity of items picked is communicated to the inventory management system and transmitted to the processor which tracks filled orders and remaining inventory.

This system of covering and uncovering signals visible to the bar code reader may be used to communicate other information to the disclosed inventory management system. For example, a virtual keyboard placed on a wall or elsewhere in an inventory management system may include multiple keys, each representing a signal the bar code reader can detect. As a worker types on the virtual keyboard, the worker's fingers cover the keys and blocking the view of the bar code reader. Upon moving the fingers off the keys, the signal returns and the bar code reader detects the signal.

Figure 6:
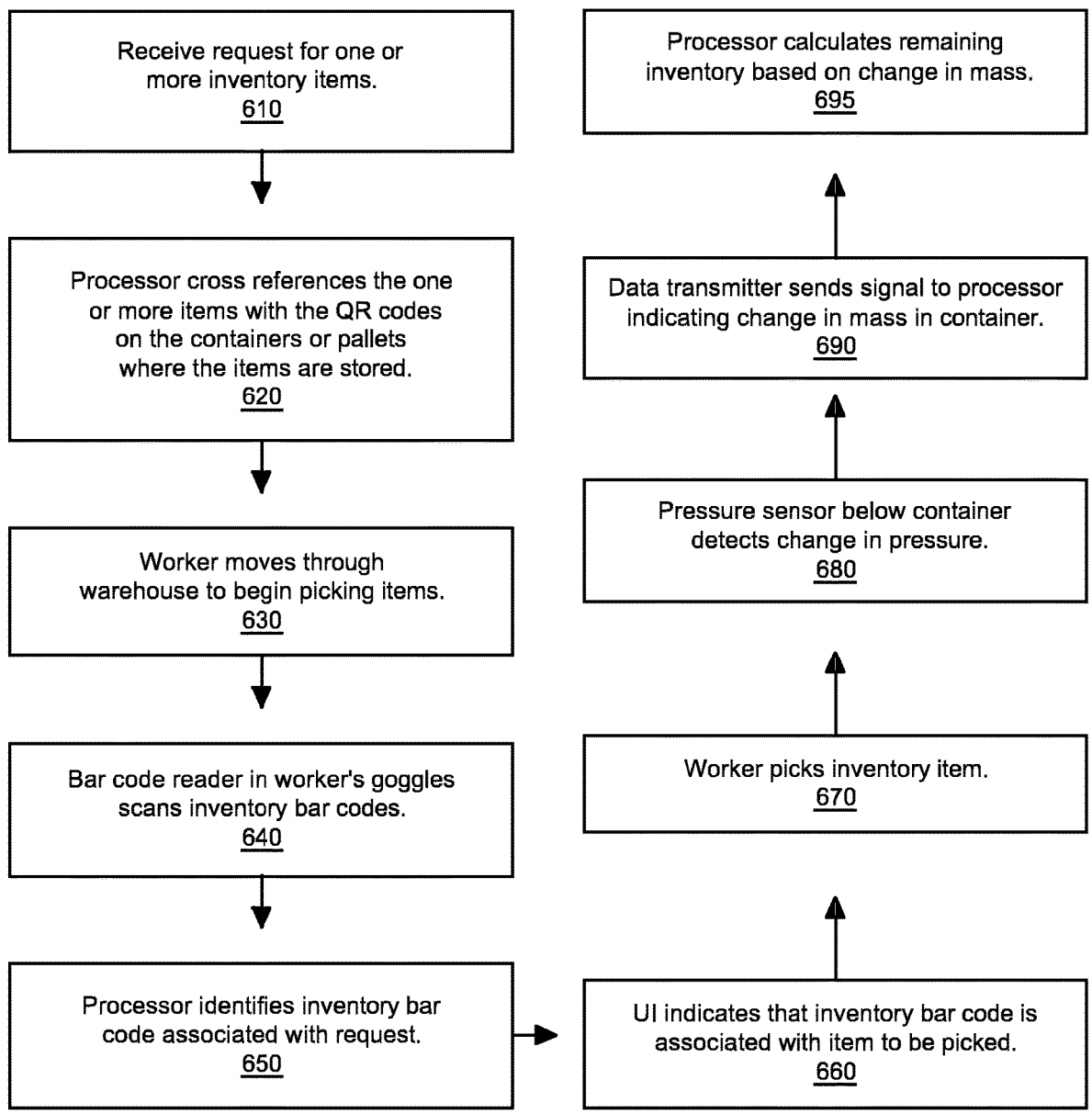
FIG. 6 is a flow chart illustrating steps which may be taken in using the disclosed inventory management system.

FIG. 6 is a flowchart illustrating steps which may be taken when using an embodiment of the disclosed inventory management system. In step 610, a worker receives a request (an order) from a customer to purchase one or more inventory items. Non-transitory computer-readable media within the system cross-references the items with the inventory bar codes on the containers which store each of the items (step 620). The worker begins moving through the inventory storage area (in this example, a warehouse) to begin picking the items (step 630). As the worker does so, the bar code reader in the worker's goggles scans inventory bar codes on containers (step 640). This continues until the worker arrives at a container which stores one of the inventory items the customer has requested and the bar code reader scans the associated inventory bar code. The processor in the inventory management system then identifies a match with one of the inventory bar code associated with the requested inventory item (step 650). The UI that the worker views through the goggles provides a cue that the scanned inventory bar code is associated with a requested item (step 660) to alert the worker to pick the item. In some embodiments the UI may be as illustrated in FIG. 2 herein. In other embodiments, the UI may include a change in the color of the inventory bar code or an audible sound.

In step 670, the worker picks the requested inventory items from the containers. When the worker removes the requested inventory items from the container, the pressure sensors detect a change in pressure due to reduced mass in the container (step 680). A data transmitter in connection with the pressure sensor sends a signal to the processor to communicate the change in pressure (step 690) and the processor calculates the change in remaining inventory based on change in mass (step 695).

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

We claim:

1. An inventory management system comprising:
a plurality of inventory storage containers;
a plurality of inventory bar codes, wherein each of the plurality of inventory bar codes is printed using an ink which reflects light comprising a wavelength which is outside the human visible range, and wherein each of the plurality of inventory bar codes is disposed on one of the plurality of inventory storage containers;
a bar code reader;
an augmented reality viewing device;
a processor;
memory that stores instructions that when executed by the processor cause the processor to:
  receive a request to retrieve at least one of the plurality of inventory items;
  receive a bar code reading transmitted from the bar code reader;
  match the bar code reading with one of the plurality of inventory bar codes which is associated with the at least one of the plurality of inventory items in the request; and
  transmit a signal to the augmented reality viewing device when the bar code reading is associated with the at least one of the plurality of inventory items in the request.

2. The inventory management system of claim 1, wherein the augmented reality viewing device comprises a data receiver configured to receive the signal, and a second processor comprising non-transitory computer-readable medium, the non-transitory computer-readable medium comprising instructions for producing a cue, wherein the cue indicates whether the bar code is associated with an inventory bar code associated with the at least one inventory items in the request.

3. The inventory management system of claim 2, wherein the augmented reality viewing device comprises a user interface, wherein the cue is communicated to a user through the user interface.

4. The inventory management system of claim 3, wherein the cue comprises a visual message.

5. The inventory management system of claim 4, wherein the cue comprises an image of the bar code reading, and wherein the user interface displays the image in a defined color which indicates whether the inventory bar code is associated with one of the at least on inventory items.

6. The inventory management system of claim 2, wherein the cue comprises an audible sound.

7. The inventory management system of claim 2, wherein the augmented reality viewing device comprises at least one of the following list: goggles, eyeglasses, a visor, an ocular contact lens, a mobile device, a computer screen, and a digital camera.

8. The inventory management system of claim 1, further comprising at least one sensor, wherein the at least one sensors is associated with one of the plurality of inventory storage containers.

9. The inventory management system of claim 8, wherein the sensor comprises a pressure sensor.

10. The inventory management system of claim 8, wherein the sensor comprises a laser beam sensor.

11. The inventory management system of claim 8, wherein the sensor further comprises a data transmitter, wherein the data transmitter is in electronic communication with the processor.

12. The inventory management system of claim 8, wherein the instructions are further executable by the processor to update an inventory record using data collected by the sensor.

13. The inventory management system of claim 1, wherein the plurality of inventory bar codes is printed using an ink which reflects light comprising a wavelength in the ultraviolet range.

14. The inventory management system of claim 1, wherein the wavelength is in the infrared range.

15. The inventory management system of claim 1, further comprising an LED or LCD screen associated with each of the inventory storage containers, wherein one of the plurality of inventory bar codes is displayed on each of the LED or LCD screens.

16. The inventory management system of claim 1, wherein the non-transitory computer-readable medium further comprises instructions for associating a picked item with the following series of signals detected by the bar code reader: the presence of an inventory bar code, followed by the absence of the inventory bar code, followed by the detected presence of the inventory bar code.

17. The inventory management system of claim 16, wherein the instructions are further executable by the processor to update an inventory record when a picked item is detected.

18. The inventory management system of claim 1, wherein the bar code reader is disposed within the augmented reality viewing device.

19. The inventory management system of claim 1, wherein the bar code reader and the augmented reality viewing device are separate apparatus.

* * * * *